United States Patent [19]

Hayashi et al.

[11] 4,368,426
[45] Jan. 11, 1983

[54] DIGITAL INDICATION TYPE SPEEDOMETER

[75] Inventors: Kunihisa Hayashi; Masakazu Moriyama, both of Toyota, Japan

[73] Assignee: Toyota Jidosha Kogyo Kabushiki Kaisha, Toyota, Japan

[21] Appl. No.: 218,500

[22] Filed: Dec. 22, 1980

[30] Foreign Application Priority Data

Dec. 28, 1979 [JP] Japan .................. 54-170608
Dec. 28, 1979 [JP] Japan .................. 54-170609

[51] Int. Cl.³ ............................................. G01P 3/48
[52] U.S. Cl. .............................. 324/161; 235/92 FQ
[58] Field of Search ............... 324/161, 166, 78 D, 324/78 Z, 79 D; 340/670, 671; 361/236, 240, 242; 235/92 FQ, 92 TF

[56] References Cited

U.S. PATENT DOCUMENTS

| 4,151,466 | 4/1979 | Boyer et al. ............... 235/92 FQ |
| 4,204,157 | 5/1980 | Javeri ........................ 324/166 |
| 4,243,938 | 1/1981 | Bliven et al. ............... 324/161 |

*Primary Examiner*—David C. Nelms
*Attorney, Agent, or Firm*—Cushman, Darby & Cushman

[57] ABSTRACT

A digital indication type speedometer comprising a speed counter for counting speed pulses emitted in proportion to a vehicle speed for a given gate time, an indication resistor for latching a value to be indicated commensurate to an output from said speed counter and an indicator for indicating the value latched in said indication register is of such an arrangement that a zero indication discriminating circuit for forcibly setting the value latched in said indication register to zero when an emitting interval of the speed pulses exceeds a predetermined period of time, is provided with or without a hysteresis processing circuit for rewriting the value latched in said indication register in accordance with an output of said speed counter only when a difference between the output of said speed counter and the value latched in said indication register is not within tolerance limit upon comparison therebetween, so that the indication is momentarily returned to zero when the vehicle is stopped, the indication is changed in a short period of time in accordance with the condition of acceleration or deceleration during acceleration or deceleration of the vehicle and no flickering of the indication occurs during running at a constant speed.

7 Claims, 5 Drawing Figures

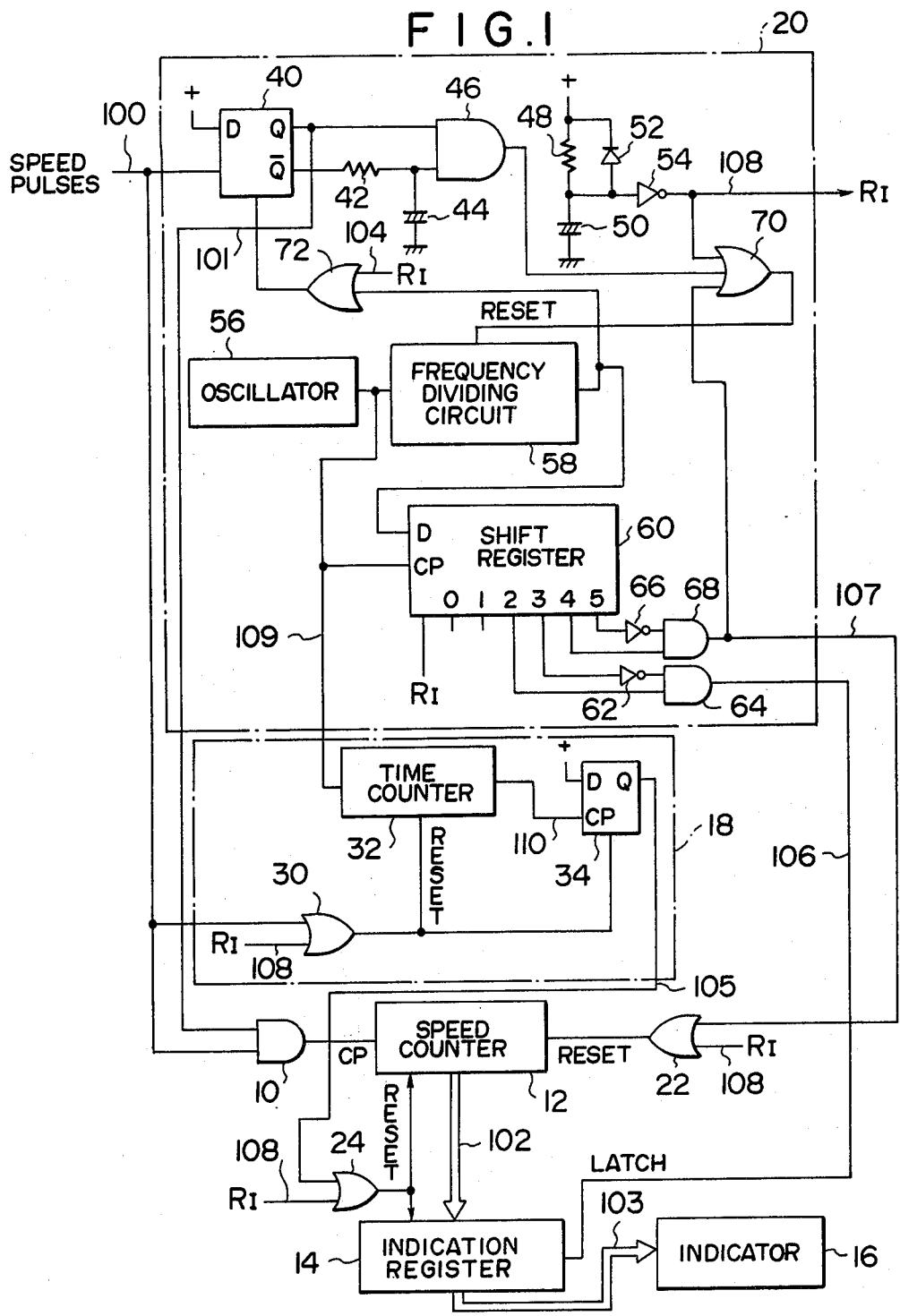

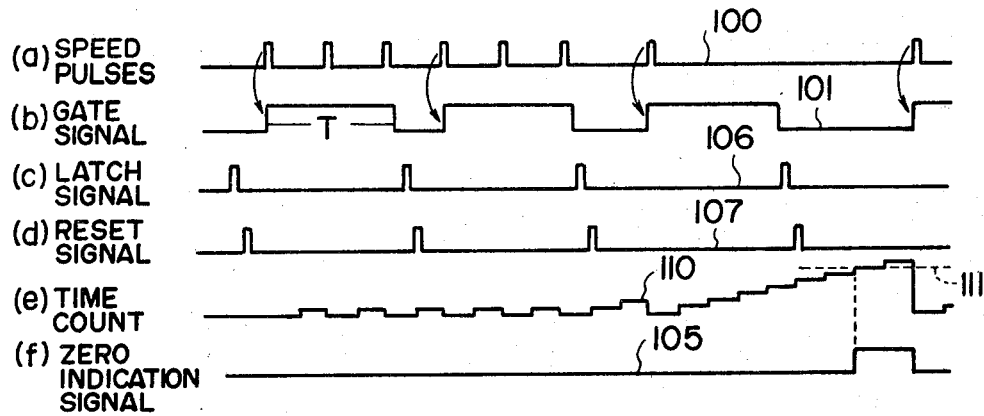
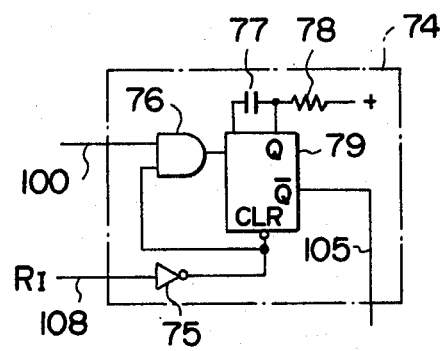
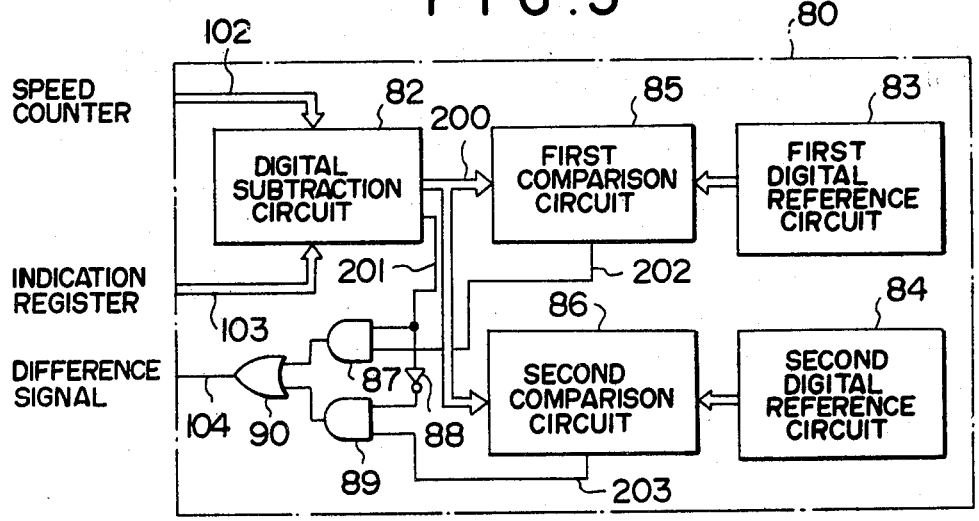

DIGITAL INDICATION TYPE SPEEDOMETER

BACKGROUND OF THE INVENTION

1. Field of the Invention

The present invention relates to digital indication type speedometers, and particularly to improvements in a digital indication type speedometer comprising a speed counter for counting speed pulses emitted in proportion to a vehicle speed for a given gate time, an indication register for latching a value to be indicated commensurate to an output from said speed counter and an indicator for indicating the value latched in said indication register.

2. Prior Art

In general, a digital indication type speedometer for digitally indicating a running speed of a vehicle or the like comprises a speed counter for counting speed pulses emitted in proportion to a vehicle speed through the rotation of a propeller shaft, wheel or the like for a given gate time, an indication register for latching the preceding value counted by the speed counter while the speed counter is counting, and an indicator for indicating the value latched in the indication register. This digital indication type speedometer has such a characteristic feature that the vehicle speed is constantly digitally indicated by the indicator. However, with this speedometer, heretofore, an output of the speed counter has been directly latched in the indication register as a value to be indicated, which is repeatedly indicated by the indicator, thereby a rewriting cycle of an indication is limited to substantially each given gate time, and, in the case the vehicle is stopped from the running condition, although the vehicle is in a stopped condition, zero is not immediately indicated because of the gate time, thus giving a feeling of incompatibility to driver. More specifically, in the case that each of the speed pulses is a 0.5 km/h/pulse and the gate time is 0.28 sec for example, if the vehicle is stopped after the speed pulses are fed upon opening of the gate, although the vehicle is in a stopped condition, it takes about two times the gate time, i.e., 0.56 sec before the indicated speed becomes 0 km/h.

Furthermore, the change in indication is slow during acceleration or deceleration, thus presenting a feeling of incompatibility between the degree of acceleration or deceleration and the change in indication. Whereas, during running at a constant speed, the change in indication is frequently made in accordance with slight changes in the vehicle speed as if it flickers, thereby deteriorating easiness in reading. More specifically, during running at a value between 59 km/h and 60 km/h for example, both of 59 km/h and 60 km/h are alternately indicated. This reaches its worst condition when an intermediate speed between 59 km/h and 60 km/h is set in a cruising speed control device of the vehicle. The shorter the gate time is, the more intense the flickering changes in indication become. Therefore, as a remedy for it, it has been taken into account to extend the gate time. However, if the response during acceleration or deceleration is taken into consideration, there is a limit in extending the gate time. Consequently, heretofore, there has been selected an intermediate value of a gate time in consideration of both factors as described above. However, the value thus selected could satisfy neither the condition during acceleration or deceleration, nor the condition during running at a constant speed.

In order to obviate the disadvantages as described above, it has been considered to change the gate time and the rewriting cycle of indication in accordance with the running conditions of the vehicle. However, the abovedescribed arrangement not only requires an acceleration sensor for sensing the running condition of the vehicle but also makes the after-treatment of signals be complicated, so that the abovedescribed arrangement is not practicable.

The present invention has been developed to obviate the abovedescribed disadvantages of the prior art, and has as its first object the provision of a digital indication type speedometer capable of making satisfactory indications without presenting any feeling of incompatibility in the case vehicle is stopped from running condition.

The present invention has as its second object the provision of a digital indication type speedometer capable of making satisfactory indications without presenting any feeling of incompatibility in all cases including the condition during acceleration or deceleration, the condition during running at a constant speed, and the case vehicle is stopped from running condition, and excellent in easiness in reading.

To accomplish the abovedescribed first object, according to the present invention, a digital indication type speedometer comprising a speed counter for counting speed pulses emitted in proportion to a vehicle speed for a given gate time, an indication register for latching a value to be indicated commensurate to an output from said speed counter and an indicator for indicating the value latched in said indication register is of such an arrangement that a zero indication discriminating circuit is provided which forcibly sets the value latched in the indication register to zero when an emitting interval of the speed pulses exceeds a predetermined period of time, so that, when the vehicle is stopped from the running condition, the indicated value is turned to be zero in a short period of time, thereby making a satisfactory indication presenting no feeling of incompatibility.

To accomplish the second object, according to the present invention, a digital indication type speedometer comprising a speed counter for counting speed pulses emitted in proportion to a vehicle speed for a given gate time, an indication register for latching a value to be indicated commensurate to an output from said speed counter and an indicator for indicating the value latched in said indication register is of such an arrangement that, a hysteresis processing circuit for rewriting the value latched in said indication register in accordance with an output of said speed counter only when a difference between the output of said speed counter and the value latched in said indication register is not within tolerance limit upon comparison therebetween, and a zero indication discriminating circuit for forcibly setting the value latched in said indication register to zero when an emitting interval of the speed pulses exceeds a predetermined period of time, are provided, so that, the indication is changed in a short period of time in accordance with the condition of acceleration or deceleration during acceleration or deceleration of the vehicle, and the indication is momentarily returned to zero when the vehicle is stopped and no flickering of the indication occurs during running at a constant speed, and the satisfactory indication presenting no feeling of incompatibility is obtainable at any time.

BRIEF DESCRIPTION OF THE DRAWINGS

The above mentioned features and objects of the present invention will become more apparent by reference to the following description taken in conjunction with the accompanying drawings, wherein like referenced numerals denote like elements, and in which:

FIG. 1 is a block diagram showing the arrangement of the first embodiment of the digital indication type speedometer according to the present invention;

FIG. 2 is a diagram showing the waveshapes of the actions of various parts in the abovementioned embodiment;

FIG. 3 is a block diagram showing a modification of the zero indication discriminating circuit according to the present invention;

FIG. 5 is a block diagram showing an example of arrangement of the hysteresis processing circuit in the abovedescribed embodiment.

DETAILED DESCRIPTION OF THE INVENTION

Figure 4:
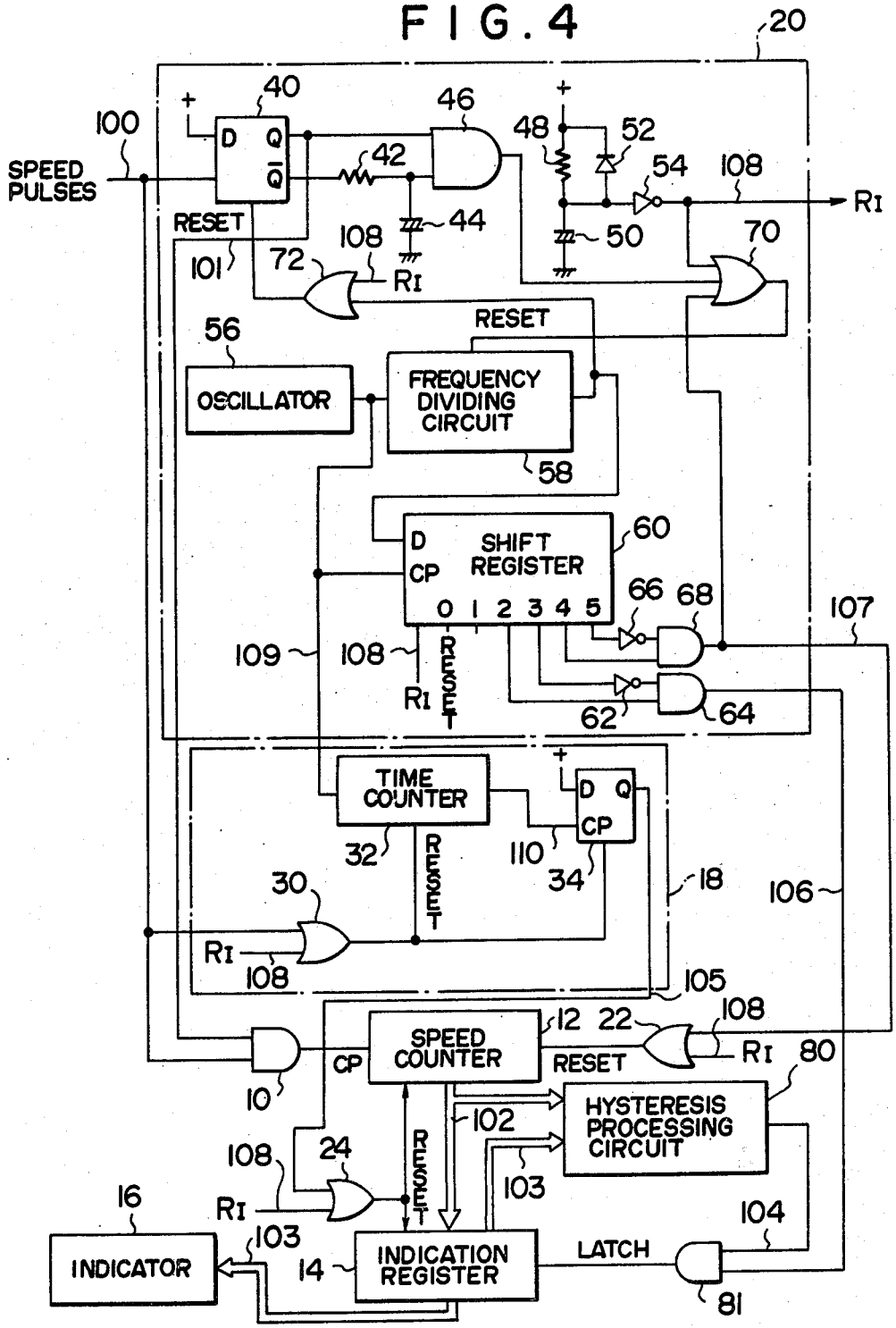
FIG. 4 is a block diagram showing the general arrangement of the second embodiment of the digital indication type speedometer according to the present invention.

Detailed description will hereunder be given of the embodiments of the present invention with reference to the drawings. As shown in FIG. 1, in the first embodiment, a digital indication type speedometer comprises: a speed counter 12 for counting speed pulses 100 emitted in proportion to a vehicle speed through the rotation of the wheel for a given gate time during which an AND gate 10 is opened in response to a gate signal 101; an indication register 14 for latching a value to be indicated in response to an output signal 102 (counted value) from the speed counter 12; and an indicator 16 comprising any one of an indicating fluorescent tube, a plasma display, a liquid crystal, a luminescent diode and the like for indicating a value 103 latched in the indication register 14; further comprises: a zero indication discriminating circuit 18 for emitting zero indication signal 105 to forcibly set the values counted by the speed counter 12 and latched in the indication register 14 to zero when the emitting interval of the speed pulses 100 exceeds a predetermined period of time. In the drawing: designated at 20 is a timing pulse generating circuit for feeding a given gate signal 101 to determined the counting time of the speed counter 12, the gate-on timing of which is synchronized with the rise of the speed pulse 100, to the AND gate 10, further feeding a latch signal 106 to the indication register 14 at a timing suitable for feeding a counted value of the speed counter 12 to the indication register 14 upon counting, further feeding a reset signal 107 for restoring the counted value of the speed counter 12 to zero to the speed counter 12 through an OR gate 22 upon feeding the abovedescribed counted value, and further feeding an initial reset signal 108 for initial resetting when the power source is turned on. Furthermore, the zero indication signal 105 from the zero indication discriminating circuit 18 is adapted to be fed to the indication register 14 and a reset terminal of the speed counter 12 through an OR gate 24.

The zero indication discriminating circuit 18 comprises: an OR gate 30 for emitting a logical sum of the speed pulse 100 and the initial reset signal 108 from the timing pulse generating circuit 20; a time counter 32 for counting clock pulse signals 109 from the timing pulse generating circuit 20 for each emitting interval of the speed pulses 100 until the counting time is reset by an output from the OR gate 30; and a bistable multivibrator 34 reset by an output from the aforesaid OR gate 30 for feeding the zero indication signal 105 to the OR gate 24 when a time count 110 from the time counter 32 exceeds a predetermined value.

Consequently, in this zero indication discriminating circuit 18, when the emittng interval of the speed pulses 100 exceeds a period of time preset by the time counter 32 and the bistable multivibrator 34, e.g., a time interval between the speed pulses in which the indicated speed becomes 1 km/h or 1 mile/h, the zero indication signal 105 from the bistable multivibrator 34 is indicated as "1", whereby the indication register 14 and the speed counter 12 are reset through the OR gate 24 to forcibly make the values thereof zero.

Furthermore, the aforesaid timing pulse generating circuit 20 comprises: a bistable multivibrator 40, to which the speed pulses 100 are fed; an AND gate 46, to which an output from a Q terminal of the bistable multivibrator 40 is directly fed and also an output from a Q terminal of the bistable multivibrator 40 is fed through a resistor 42 and a capacitor 44; a resistor 48, a capacitor 50, a diode 52 and an inverter 54 for emitting an initial reset signal 108 when the power source is turned on; an oscillator 56 for emitting clock pulse signals 109; a shift resistor 60 to a CP terminal of which an output from the oscillator 56 is directly fed and to a D terminal of which the output from the oscillator 56 is fed through a frequency dividing circuit 58; an AND gate 64 adapted to received an output from the shift register 60 directly and through an inverter 62 and emit the latch signal 106; an AND gate 68 adapted to receive the output from the shift register 60 directly and through an inverter 66 and emit a reset signal 107 at a timing slightly behind the latch signal 106; a three-input OR gate 70 adapted to receive the reset signal 107 from the AND gate 68, an output from the AND gate 46 and the initial reset signal 108 from the inverter 54 and feed a reset signal to the frequency dividing circuit 58; and an OR gate 72 adapted to receive the initial reset signal 108 from the inverter 54 and an output from the frequency dividing circuit 58 and feed a reset signal to the bistable multivibrator 40.

Description will hereunder be given of operation with reference to FIG. 2. The speed pulses 100 emitted in proportion to the vehicle speed through the rotation of the wheel as shown in FIG. 2(a) are fed to the speed counter 12 through the AND gate 10 and counted for a given time T during which the gate signal 101 from the timing pulse generating circuit 20 as shown in FIG. 2(b) is indicated as "1" to open the AND gate 10. This gate signal 101 is synchronized with the rise of the speed pulse 100 to be indicated as "1", continues to be indicated as "1" for the given time T, and thereafter, is indicated as "0". Upon the change of this gate signal 101 to "0", the latch signals 106 as shown in FIG. 2(c) is fed to the indication register 14 from the timing pulse generating circuit 20. When "1" is fed to this latch signal 106, the value latched in the indication register 14 is rewritten in response to the output signal 102 (counted value) from the speed counter 12, and the value 103 latched in this indication register 14 becomes the indicated value of the indicator 16.

On the other hand, the speed pulses 100 and the initial reset signal 108 are fed as the reset signal to the time counter 32 of the zero indication discriminating circuit 18 through the OR gate 30, and the time counter 32, as shown in FIG. 2(e), is adapted to count the clock pulse signals 109 from the oscillator 56 of the timing pulse generating circuit 20 for each emitting interval of the speed pulses 100 as a time count 110. When the vehicle is brought into a very slow running condition or stopped condition and the time count 110 counted by the time counter 32 exceeds a value 111 corresponding to a predetermined interval preset in the bistable multivibrator 54, e.g., less than 1 km/h or 1 mile/h of the vehicle speed, the zero indication signal 105 from the bistable multivibrator 34, as shown in FIG. 2(f), is indicated as "1", which is fed as the reset signal to the indication register 14 and the speed counter 12 through the OR gate 24, whereby the values of the indication register 14 and the speed counter 12 are forcibly turned to be zero. The reason why an output from the zero indication discriminating circuit 18 is fed to not only the indication register 14 but also the speed counter 12 here is to prevent the flickering of the indication caused by the difference between the values of the speed counter 12 and the indication register 14 during a very slow running condition. With the arrangement as described above, such an emitting interval between the speed pulses is preset to be the value corresponding to the speed 1 km/h or 1 mile/h, whereby monitoring is made as to whether the vehicle speed becomes 0 km/h or 0 mile/h everytime a speed pulse is emitted, so that, when the vehicle has stopped and the speed becomes less than 1 km/h or 1 mile/h, the value latched in the indication register 14 can be made zero and the value indicated by the indicator 16 can be made zero immediately. As against the above, heretofore, there have been observed such indications that, under the worst condition, i.e., in the case a speed pulse 100 corresponding to more than 1 km/h is fed immediately after the gate signal 101 has been indicated as "1", and, if the vehicle is instantly brought into a stopped condition, then the gate signal 101 indicated as "1" is turned into "0" to indicate a speed more than 1 km/h, and further, when "1" is fed to the latch signal 102 after the gate signal is turned from "1" to "0", then 0 km/h is indicated. With the arrangement as described above, the indicated value can not become zero immediately after the vehicle is stopped, thereby presenting a feeling of incompatibility.

On the other hand, "1" is fed from the AND gate 64 of the timing pulse generating circuit 20 to the latch signal 106, thereafter, "1" is fed from the AND gate 68 to the reset signal 107 as shown in FIG. 2(d), and the speed counter 12 is reset so as to be ready for the speed pulse counting during the succeeding gate time. Consequently, when "1" is fed to the speed pulse 100 after "1" is fed to the reset signal 107, the gate signal 101 is synchronized with the rise of the speed pulse 100 by the timing pulse generating circuit 20 and indicated as "1". The synchronization of the speed pulse 100 with the gate signal 101 is to prevent the dispersion of the values counted by the speed counter caused by the shifting of the gate relative to the speed pulses.

In addition, since there is a possibility that the abovedescribed operation is not satisfactorily effected when the power source is turned on, initial resettings are effected by the initial reset signal 108 on the speed counter 12, the indication register 14, the time counter 32 and bistable multivibrator 34 of the zero indication discriminating circuit 18, the bistable multivibrator 40 and shift register 60 of the timing pulse generating circuit 20 and the like, thereby preventing the malfunction.

In addition, in the abovedescribed embodiment, the zero indication discriminating circuit is constituted by the time counter and the bistable multivibrator. However, the constitution of the zero indication discriminating circuit is not limited to the one shown in the abovedescribed embodiment.

FIG. 3 shows a modification of the zero indication discriminating circuit used in the present invention. This zero indication discriminating circuit 74 comprises: an inverter 75 for inverting the initial reset signal 108 ($R_I$) from the timing pulse generating circuit 20; an AND gate 76 for emitting a logical product of the speed pulse 100 and an output from the inverter 75; and a retriggerable monostable circuit 79 adapted to be set by an output from the AND gate 76 and to have its value be cleared by an output from the inverter 75, and having a preset time preset by a capacitor 77 and resistor 78, for emitting an output from a Q terminal as the zero indication signal 105 when the time interval between the outputs from the AND gate 76 exceeds the preset time.

In the first embodiment, in the case the gate time of the speed counter is 0.28 sec, each of the speed pulses is a 0.5 1 km/h/pulse and the indicated value is set at 1 km/h at the time two speed pulses are counted within a gate time, the indicated value is set at zero at the time no pulse was counted within 0.14 sec, i.e., half the gate time, so that the time delay can be shortened to 0.14 sec, while, heretofore, in the worst case, zero indication was delayed for 0.56 sec.

FIG. 4 shows the second embodiment of the present invention. In this second embodiment, a digital indication type speedometer comprises like the first embodiment: the speed counter 12, the indication register 14, the indication 16, the zero indication discriminating circuit 18 the timing pulse generating circuit 20, the AND gate 10, and the OR gates 22 and 24; further comprises: a hysteresis processing circuit 80 for emitting a difference signal 104 (a signal indicating the presence of a difference) for rewriting a value latched in the indication register 14 in response to an output signal 102 of the speed counter 12 only when a difference between the output signal 102 from the speed counter 12 and the value 103 latched in the indication register 14 is not within tolerance limit such as ±1 km/h or ±1 mile/h upon comparison therebetween. And said zero indication discriminating circuit 18 is used for the purposes of preventing an offset in indication occurring due to the provision of the hysteresis processing circuit 80 between an output from the speed counter 12 and an indication of the indicator 16 when the actual vehicle speed is 0 km/h or 0 mile/h and quickly making the indicated value zero when the vehicle is stopped from running condition. In the drawing, designated at 81 is an AND gate which emits a logical product of said difference signal 104 and latch signal 106 to the indication register 14.

The aforesaid hysteresis processing circuit 80, as shown in FIG. 5 for example, comprises: a digital subtraction circuit 82 for calculating a difference between the output signal 102 of the speed counter 12 and the value 103 latched in the indication register 14; a first digital reference circuit 83 for digitally presetting the positive hysteresis reference value, e.g., +1 km/h or +1 mile/h; a second digital reference circuit 84 for digitally presetting the negative hysteresis reference value, e.g., −1 km/h or −1 mile/h; a first comparison circuit 85 for emitting an output signal 202 based on an output 200 of the result of subtraction of the digital subtraction circuit 82 when the output from the speed counter 12, exceeding the positive reference value of the first digital reference circuit 83, becomes larger than the value latched in the indication register 14; a second comparison circuit 86 for emitting an output signal 203 also based on the output 200 of the result of subtraction of the digital subtraction circuit 82 when the output from the speed counter 12, exceeding the negative reference value of the reference circuit 84, becomes smaller than the value latched in the indication register 14; a first AND gate 87 openable by a positive-negative sign signal 201 indicating "1" to a positive sign and "0" to a negative sign of the result of subtraction of the digital subtraction circuit 82, when the result of subtraction is positive, so as to pass an output signal 202 from the first comparison circuit 85; a second AND gate 89 openable by the positive-negative sign signal 201 inverted by an inverter 88, when the result of subtraction is negative so as to pass an output signal 203 from the second comparison circuit 86; and an OR gate 90 for emitting a logical sum of the first AND gate 87 and the second AND gate 89 as the difference signal 104.

Consequently, this hysteresis processing circuit 80 is adapted to seek a difference between the output signal 102 of the speed counter 12 and the value 103 latched in the indication register 14, and, when the difference is not within the tolerance limit, indicate the difference signal 104 as "1". More specifically, the value 103 latched in the indication register 14 is subtracted from the output signal 102 from the speed counter 12 in the digital subtraction circuit 82, the result of subtraction is compared with the positive hysteresis reference value preset in the first digital reference circuit 83, i.e., +1 km/h or +1 mile/h in the first comparison circuit 85, and, when the result of subtraction is larger than the positive reference value, the output signal 202 from the first comparison circuit 85 is indicated as "1". Furthermore, in the second comparison circuit 86, the result of subtraction of the digital subtraction circuit 82 is compared with the negative hysteresis reference value preset in the second digital reference circuit 84, e.g., −1 km/h or −1 mile/h, and, when the result of subtraction is smaller in value than the negative reference value, the output signal 203 is indicated as "1". The first and second AND gates 87 and 89 are for use in selecting either one of comparison circuits in dependence upon the sign of the output from the digital subtraction circuit 82, which is either positive or negative. When the result of subtraction of thecircuit 82 is positive and the positive-negative sign signal 201 is "1", the first AND gate 87 is opened, and when the result of subtraction of the digital subtraction circuit 82 is negative and the positive-negative sign signal 201 is "0", the second AND gate 89 is opened. The OR gate 90 is adapted to indicate the difference signal 104 as "1", when either the first AND gate 87 or the second AND gate 89 emits an output.

Description will hereunder be given of operation with reference to the aforesaid FIG. 2. The speed pulses 100 emitted in proportion to the vehicle speed through the rotation of the wheel as shown in FIG. 2(a) are fed to the speed counter 12 through the AND gate 10 and counted for a given time T during which the gate signal 101 from the timing pulse generating circuit 26 as shown in FIG. 2(b) is indicated as "1" to open the AND gate 10. This gate signal 101 is synchronized with the rise of the speed pulse 100 to be indicated as "1", continues to be indicated as "1" for the given time T, and thereafter, is indicated as "0". Upon the change of this gate signal 101 to "0", the latch signals 106 as shown in FIG. 2(c) is fed to the AND gate 24 from the timing pulse generating circuit 20. In parallel with this, the difference between the output signal 102 of the speed counter 12 and the value 103 latched in the indication register 14 is sought in the hysteresis processing circuit 80, and, when the difference thus sought exceeds the reference value preset by the digital reference circuit 83 or 84 in either positive or negative direction, the difference signal 104 is indicated as "1". This difference signal 104 is fed to the AND gate 81, where it is turned to be the gate signal for the aforesaid latch signal 106. With the arrangement as described above, in the case the difference signal 104 is indicated as "1", if "1" is fed to the latch signal 106 by the timing pulse generating circuit 20, then the output from the AND gate 81 is indicated as "1", and the value latched in the indication register 14 is rewritten in accordance with the output signal 102 (counted value) of the speed counter 12. While, in the case the difference between the output signal 102 of the speed counter 12 and the value 103 latched in the indication register 14 does not exceed the reference value, the difference signal 104 remains as "0", and even if "1" is fed to the latch signal 106, the value latched in the indication register 14 is not rewritten.

Consequently, when the difference between the output (counted value) from the speed counter 12 and the value latched in the indication register 14 does not exceed the predetermined value preset by the hysteresis processing circuit 80, e.g., ±1 km/h or ±1 mile/h, the value latched in the indication register 14 is not changed, whereby the indicated value of the indicator 16 is held at a constant value, so that the indication of the indicator 16 can be prevented from flickering during running at a constant speed. On the other hand, under the condition where the output from the speed counter 12 is changed to a considerable extent as in acceleration or deceleration, the value latched in the indication register 14 is rewritten every moment, so that problems in response during acceleration or deceleration can be eliminated.

On the other hand, the speed pulses 100 and the initial reset signal 108 are fed as the reset signal to the time counter 32 of the zero indication discriminating circuit 18 through the OR gate 30, and the time counter 32, as shown in FIG. 2(e), is adapted to count the clock pulse signals from the oscillator 56 of the timing pulse generating circuit 20 for each emitting interval of the speed pulses 100 as a time count 110. When the vehicle is brought into a very slow running condition or stopped condition and the time count 110 counted by the time counter 32 exceeds a value 111 corresponding to a predetermined interval preset in the bistable multivibrator 34, e.g., less than 1 km/h or 1 mile/h of the vehicle speed, the zero indication signal 105 from the bistable multivibrator 34, as shown in FIG. 2(f), is indicated as "1", which is fed as the reset signal to the indication register 14 and the speed counter 12 through the OR gate 24, whereby the values of the indication register 14 and the speed counter 12 are forcibly turned to be zero. With the arrangement as described above, such an emitting interval between the speed pulses is preset to be the value corresponding to the speed 1 km/h or 1 mile/h, whereby monitoring is made as to whether the vehicle speed becomes 0 km/h or 0 mile/h everytime a speed pulse is emitted, so that, when the vehicle has stopped and the speed becomes less than 1 km/h or 1 mile/h, the value latched in the indication register 14 can be made zero and the value indicated by the indicator 16 can be made zero immediately. Furthermore, the provision of this zero indication discriminating circuit 18 can prevent that, when the vehicle is stopped from the running condition, the value latched in the indication register 14 does not become zero irrespective of that the actual vehicle speed is zero because the difference between the actual vehicle speed and the indicated value is less than the reference value of the hysteresis presetting circuit 80, whereby the indication other than zero constantly remains in the indicator 16.

On the other hand, "1" is fed from the AND gate 64 of the timing pulse generating circuit 20 to the latch signal 106, thereafter, "1" is fed from the AND gate 68 to the reset signal 107 as shown in FIG. 2(d), and the value counted by the speed counter 12 is reset to zero through the OR gate 22 so as to be ready for the speed pulse counting during the succeeding gate time. Consequently, when "1" is fed to the speed pulse 100 after "1" is fed to the reset signal 107, the gate signal 101 is emitted in synchronizm with the rise of the speed pulse 100 from the timing pulse generating circuit 20 and indicated as "1".

In the second embodiment, in the case the gate time of the speed counter is 0.28 sec, each of the speed pulses is 0.5 km/h/pulse and the indicated value is set at 1 km/h at the time two speed pulses are counted within a gate time, the hysteresis reference value is set at ±1 km/h and the indicated value is set at zero at the time no pulse was counted within 0.14 sec, i.e., half the gate time, and thus the satisfactory indication with no feeling of incompatibility is obtained during runnings under all conditions.

From the foregoing description, it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. A digital indication type speedometer comprising;
  a speed counter for counting speed pulses emitted in proportion to a vehicle speed for a given gate time,
  an indication register for latching a value to be indicated commensurate to an output from said speed counter,
  an indicator for indicating the value latched in said indication register, and
  a zero indication discriminating circuit for forcibly setting the value latched in said indication register to zero when our emitting interval of the speed pulses exceeds a predetermined period of time.

2. A speedometer as set forth in claim 1, wherein said zero indication discriminating circuit forcibly sets not only the value latched in said indication register but also a value counted by said speed counter to zero.

3. A speedometer as set forth in claim 1 or 2, wherein said zero indicationdiscriminating circuit comprises;
  a time counter for counting clock pulse signals for each emitting interval of the speed pulses, and
  a bistable multivibrator for feeding the zero indication signal when a time count from the time counter exceeds a predetermined value.

4. A speedometer as set foth in claim 1 or 2, wherein said zero indication discriminating circuit comprises;
  an inverter for inverting an initial reset signal,
  an AND gate for emitting a logical product of the speed pulse and an output from said inverter, and
  a retriggerable monostable circuit adapted to be set by an output from the AND gate and to have its value be cleared by an output from said inverter, and having a preset time, for emitting an output from a Q terminal as a zero indication signal when the time interval between the outputs from said AND gate exceeds the preset time.

5. A digital indication type speedometer comprising;
  a speed counter for counting speed pulses emitted in proportion to a vehicle speed for a given gate time,
  an indication register for latching a value to be indicated commensurate to an output from said speed counter,
  an indicator for indicating the value latched in said indication register,
  a hysteresis processing circuit for rewriting the value latched in said indication register in accordance with an output of said speed counter only when a difference between the output of said speed counter and the value latched in said indication register is not within tolerance limit upon comparison therebetween, and
  a zero indication discriminating circuit for forcibly setting the value latched in said indication register to zero when an emitting interval of the speed pulses exceeds a predetermined period of time.

6. A speedometer as set forth in claim 5, wherein said hysteresis processing circuit comprises;
  a digital subtraction circuit for calculating a difference between the output of said speed counter and the value latched in said indication register,
  a first digital reference circuit for digitally presetting a positive hysteresis reference value,
  a second digital reference circuit for digitally presetting a negative hysteresis reference value,
  a first comparison circuit for emitting an output based on an output of the result of subtraction of said digital subtraction circuit when the output from said speed counter, exceeding the positive reference value, becomes larger than the value latched in said indication register,
  a second comparison circuit for emitting an output based on an output of the result of subtraction of said digital subtraction circuit when the output from said speed counter, exceeding the negative reference value, becomes smaller than the value latched in said indication register, and
  an OR gate for emitting a logical sum of outputs form said first and second comparison circuits as a difference signal.

7. A speedometer as set forth in claim 6, wherein said positive hysteresis reference value is +1 km/h or +1 mile/h, and said negative hysteresis reference value is −1 km/h or −1 mile/h.

* * * * *